(12) United States Patent
Ducellier et al.

(10) Patent No.: US 6,765,679 B2
(45) Date of Patent: Jul. 20, 2004

(54) MULTI-CAVITY INTERFEROMETER WITH DISPERSION COMPENSATING RESONATORS

(75) Inventors: Thomas Ducellier, Ottawa (CA); Kuochou Tai, Fremont, CA (US); Marie-Josee Picard, Ottawa (CA)

(73) Assignee: JDS Uniphase Corporation, San Jose, CA (US)

( * ) Notice: Subject to any disclaimer, the term of this patent is extended or adjusted under 35 U.S.C. 154(b) by 152 days.

(21) Appl. No.: 10/150,001

(22) Filed: May 20, 2002

(65) Prior Publication Data

US 2002/0180981 A1 Dec. 5, 2002

Related U.S. Application Data

(60) Provisional application No. 60/293,985, filed on May 30, 2001, and provisional application No. 60/312,469, filed on Aug. 16, 2001.

(51) Int. Cl.[7] .............................................. G01B 9/02
(52) U.S. Cl. ....................................... 356/491; 356/519
(58) Field of Search ................................ 356/491, 519; 359/618

(56) References Cited

U.S. PATENT DOCUMENTS

| | | | |
|---|---|---|---|
| 6,130,971 A | 10/2000 | Cao | 385/31 |
| 6,169,604 B1 | 1/2001 | Cao | 356/519 |
| 6,169,626 B1 | 1/2001 | Chen et al. | 359/279 |
| 6,215,926 B1 | 4/2001 | Cao | 385/36 |
| 6,252,716 B1 | 6/2001 | Paiam | 359/618 |
| 6,519,065 B1 * | 2/2003 | Colbourne et al. | 398/81 |

* cited by examiner

Primary Examiner—Samuel A. Turner
(74) Attorney, Agent, or Firm—Allen, Dyer, Doppelt, Milbrath & Gilchrist, P.A.

(57) ABSTRACT

Interleavers, based on a Michelson interferometer with a Gires-Tournois (GT) etalon in each arm, are becoming popular in the filtering of light in the fiber optics telecommunications industry. As the channel spacing becomes closer together, e.g. 50 GHz or 25 GHz, dispersion compensation becomes an important factor in the choice and design of a system. The present invention solves the problem of increased chromatic dispersion by utilizing multi-cavity Gires-Tournois (MCGT) etalons, wherein the dispersion from one MCGT is used to compensate or cancel the dispersion from the other MCGT. In an optimum design for a dual cavity GT etalon, the dispersion profile of the first MCGT will have a similar amplitude and frequency as the dispersion profile of the second MCGT, only shifted by half the period so that the positive slopes of one profile are aligned with the negative slopes of the other profile.

20 Claims, 12 Drawing Sheets

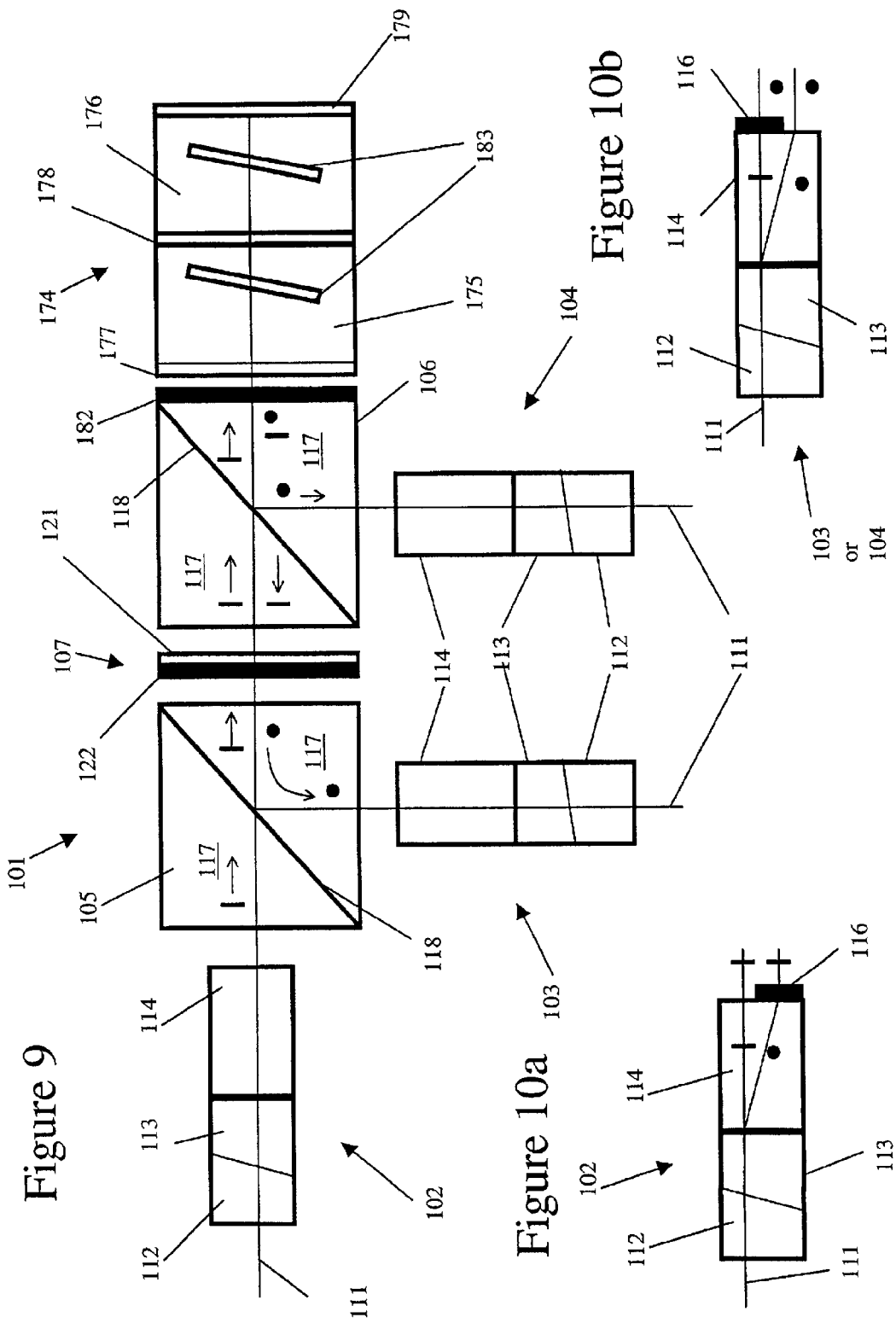

MULTI-CAVITY INTERFEROMETER WITH DISPERSION COMPENSATING RESONATORS

CROSS-REFERENCE TO RELATED APPLICATIONS

The present application claims priority from U.S. Patent Applications No. 60/293,985 filed May 30, 2001, and No. 60/312,469 filed Aug. 16, 2001.

TECHNICAL FIELD

The present application relates to an optical interferometer, and in particular to a multi-cavity etalon interferometer useful as a low dispersion optical interleaver filter.

BACKGROUND OF THE INVENTION

Optical interleavers are becoming a popular tool in dense wavelength division multiplexed (DWDM) communications networks as an interface between components designed for signals with a first wavelength channel spacing and components designed for signals with a second wavelength channel spacing. In the past 200 GHz channel spacing was the norm, but as the demand for increased bandwidth grew, 100 GHz channel spacing became the standard. In the next generation of communications networks 50 GHz channels spacing and even 25 GHz channel spacing will become common place. However, conventional de-multiplexing filters, e.g. dichroic filters, do not have the capability to separate channels that are so closely spaced. Accordingly, optical interleavers are used to separate the closely spaced channels into two sets of channels, which are twice as far apart. This process can continue until the channels are far enough apart for conventional multiplexing to be effective.

Interleavers can take several forms, including Birefringent Crystal Interleavers, Integrated Lattice Filter Interleavers, and Michelson Gires-Tournois (MGT) Interleavers. The present invention relates to Michelson Gires-Tournois Interleavers, such as those disclosed in U.S. Pat. No. 6,169,626 issued Jan. 2, 2001 in the name of Jye-Hong Chen et al, and U.S. Pat. No. 6,252,716 issued Jun. 26, 2001 in the name of Reza Paiam. Both of these references disclose the use of an interferometer, including a beamsplitter and two Gires-Tournois (GT) resonators, for interleaving/de-interleaving optical wavelength channels. Polarization-based versions of the MGT Interleavers are disclosed in U.S. Pat. No. 6,130,971 issued Oct. 10, 2000; U.S. Pat. Nos. 6,169,604 and 6,169,828 issued Jan. 2, 2001; and U.S. Pat. No. 6,215,926 issued Apr. 10, 2001 all in the name Simon Cao. The polarization-based interferometers typically include a polarization beam splitter (PBS) and two GT resonators each with a birefringent waveplate therein. GT etalons with a birefringent waveplate are referred to as BGTs. Single BGT versions of the invention are possible, since orthogonally polarized components of a single beam will effectively "see" different resonators, if an appropriate waveplate is provided in the resonator cavity. However, polarization diversity front ends are required in the single BGT versions.

The aforementioned conventional MGT Interleavers provide acceptable chromatic dispersion at 100 GHz; however, unacceptable chromatic dispersion is created at the 50 and 25 GHz level.

An object of the present invention is to overcome the shortcomings of the prior art by providing an optical interferometer for use as an interleaver, which displays relatively low dispersion.

SUMMARY OF THE INVENTION

Accordingly, the present invention relates to an interferometer comprising:

a first port for launching a first input optical signal;

a beam splitter for dividing the first input optical signal into first and second sub-beams, and for directing the first and second sub-beams along first and second optical paths, respectively;

a first multi-cavity resonator in the first optical path for re-directing the first sub-beam to interfere with the second sub-beam, the first multi-cavity resonator including a first resonant cavity providing a first dispersion profile to the first sub-beam, and a second resonant cavity for modifying the first dispersion profile resulting in a second dispersion profile for the first sub-beam;

a second multi-cavity resonator in the second optical path for re-directing the second sub-beam to interfere with the first sub-beam forming first and second output beams, the second multi-cavity resonator including a third resonant cavity providing a third dispersion profile to the second sub-beam, and a fourth resonant cavity for modifying the third dispersion profile resulting in a fourth dispersion profile for the second sub-beam, wherein dispersion from the first multi-cavity resonator compensates for dispersion in the second multi-cavity resonator providing less overall dispersion to the first and second output beams;

a second port for outputting the first output signal; and a third port for outputting the second output signal.

Another aspect of the present invention relates to an interferometer comprising:

a first port for launching a first input optical signal;

first phase-biasing means for introducing an initial phase difference between first and second orthogonally polarized components of the first input optical signal;

a multi-cavity resonator comprising first and second resonant cavities, each of the first and second resonant cavities including second phase biasing means for providing an additional phase difference between the first and second components of the input optical signal, whereby, when the first and second components are recombined, first and second output beams are formed; wherein the first resonant cavity provides first and second dispersion profiles to the first and second components, respectively, and the second resonant cavity modifies the first and second dispersion profiles resulting in third and fourth dispersion profiles, respectively, whereby the dispersion from the first component compensates for the dispersion from the second component, and the first and second output signals have less overall dispersion;

a second port for outputting the first output signal; and a third port for outputting the second output signal.

BRIEF DESCRIPTION OF THE DRAWINGS

The present invention will be described in greater detail with reference to the accompanying drawings which represent preferred embodiments thereof, wherein:

FIG. 4b is a chromatic dispersion profile for the interleaver of FIG. 4a;

FIG. 9 is a schematic representation of a polarization-based multi-cavity BGT interferometer comprising a single multi-cavity BGT resonator according to another embodiment of the present invention;

FIGS. 10a and 10b are side views of the ports from the interferometer of FIG. 9;

DETAILED DESCRIPTION

Figure 1:
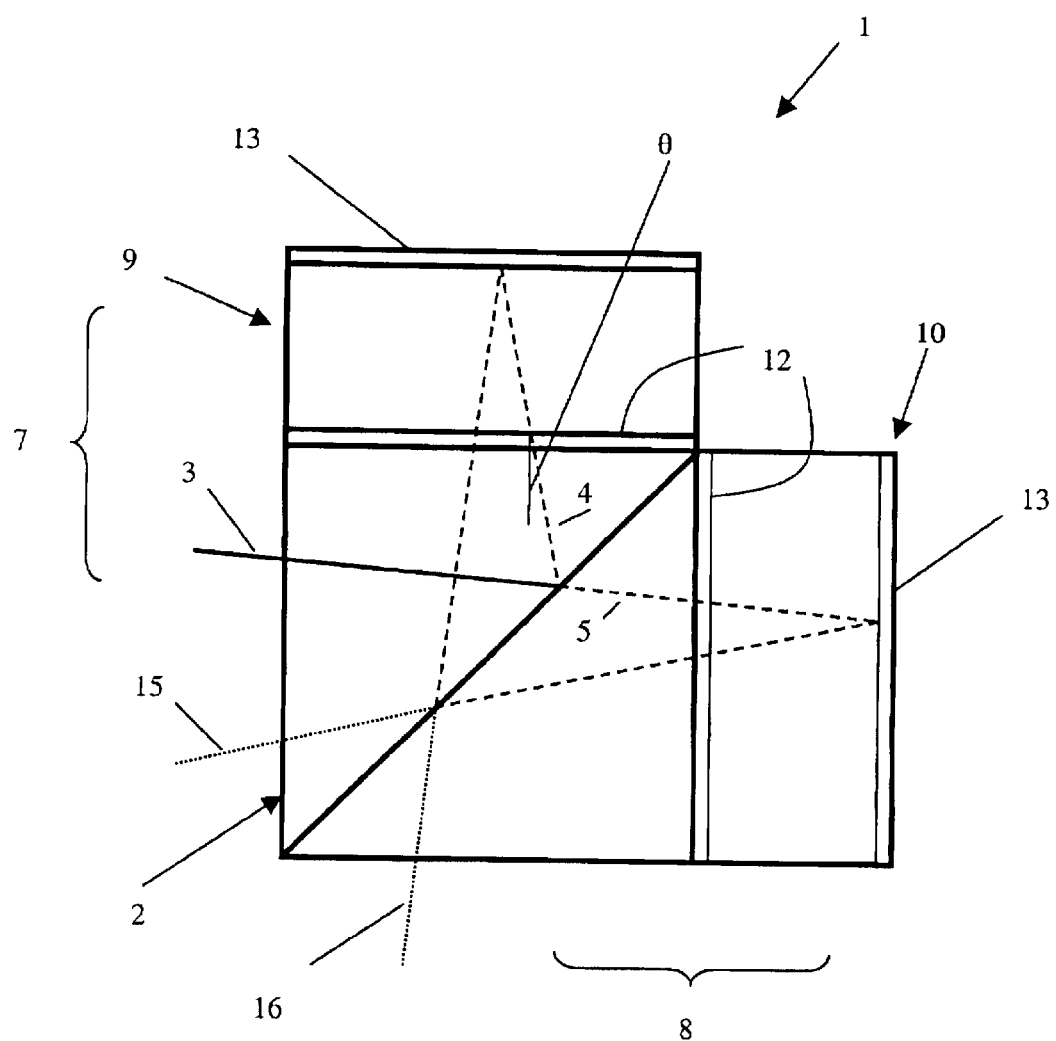
FIG. 1 is a schematic representation of a conventional MGT interferometer.

The conventional MGT interferometer, generally indicated at 1 in FIG. 1, includes a beam splitter 2 for separating an incoming light beam 3 into sub-beams 4 and 5, and for directing the sub-beams 4 and 5 along separate arms 7 and 8 to resonators 9 and 10. The resonators 9 and 10 are typically in the form of Gires-Tournois etalons; however, other forms of resonators are possible, such as ring resonators. Each resonator is comprised of a front partially reflective mirror 12 and at least one substantially fully reflective mirror 13. The mirrors 12 can have the same reflectivity or different reflectivity's, depending on the desired response. Similarly, the arms 7 and 8 can have the same effective path length or there can be an optical path length difference. The resonators 9 and 10 provide both of the sub-beams 7 and 8 with a nonlinear response curve, and direct the sub-beams 7 and 8 back together causing interference, resulting in a pair of output beams 15 and 16 being formed. Accordingly, when the device is arranged as an interleaver/deinterleaver the output beams 15 and 16 comprise odd and even spaced wavelength channels, respectively. As an example, for a given free spectral range (FSR) the resonators 9 and 10 will have a cavity length 2 L defined by the equation:

$$2L = c/(2 \times n \times FSR \times \cos(\theta))$$

in which:
- c is the speed of light;
- n is the index of refraction of the resonator cavity; and
- θ is the angle from normal at which the sub-beams enter the resonators.

As well known in the art, the aforementioned assembly can also be used to interleave two sets of wavelength channels into a single set of closely spaced channels by launching the two sets along the paths taken by the output signals 15 and 16. The resulting closely spaced set of wavelength channels will exit via the path taken by the incoming light beam 3.

Figure 2:
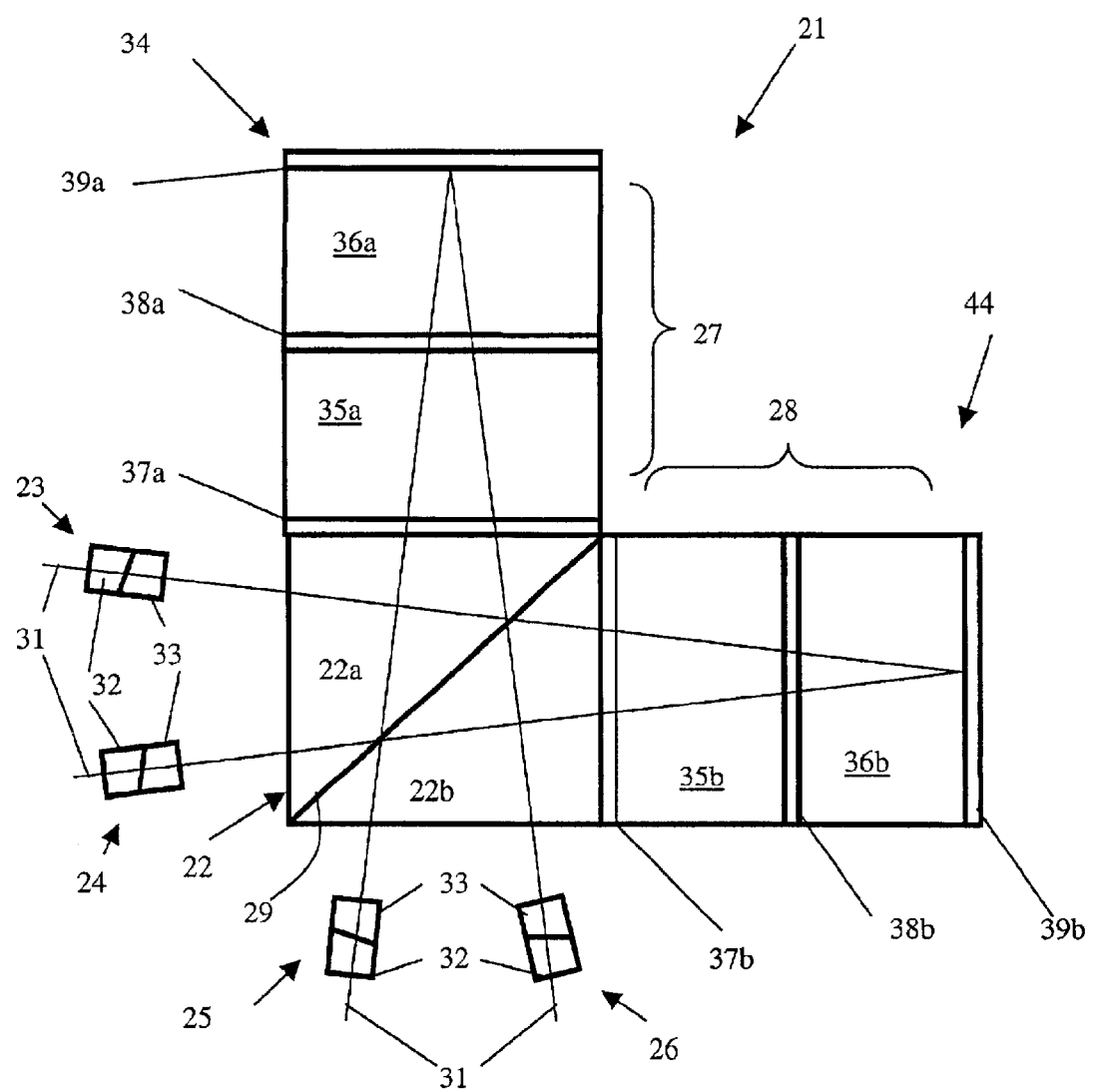
FIG. 2 is a schematic representation of a multi-cavity MGT interferometer according to the present invention.

With reference to FIG. 2, a multi-cavity MGT interferometer according to the present invention is generally indicated at 21, and includes a beam splitter 22, a first port 23, a second port 24, a third port 25, a fourth port 26, a first arm 27 and a second arm 28. The beam splitter 22 is preferably a 50/50 beam splitter comprised of two triangular prisms 22a and 22b with a partially reflective coating 29 therebetween. Each port 23, 24, 25 and 26 preferably includes an end of an optical waveguide 31 encased in a ferrule 32, and optically coupled to a graded index (GRIN) lens 33. Although the preferred embodiment of the present invention requires only three ports, a four port device is also within the scope of the invention. Moreover, all four ports are illustrated to show the flexibility of the device, i.e. light launched through either the first port 23 or the fourth port 26 will exit the second port 24 and/or the third port 25 and vice versa.

The first arm 27 preferably includes a first multi-cavity GT etalon 34, which is comprised of a front resonant cavity 35a, and a rear resonant cavity 36a. The preferred embodiment comprises two resonant cavities; however, additional resonant cavities are within the scope of this invention. The front resonant cavity is defined by a front partially-reflective surface 37a and a middle partially-reflective surface 38a. The rear resonant cavity 36a is defined by the middle partially-reflective surface 38a and a back substantially fully-reflective surface 39a.

Similarly, the second arm 28 preferably includes a second multi-cavity GT etalon 44, which is comprised of a front resonant cavity 35b, and a rear resonant cavity 36b. The front resonant cavity is defined by a front partially-reflective surface 37b and a middle partially-reflective surface 38b. The rear resonant cavity 36b is defined by the middle partially-reflective surface 38b and a back substantially fully-reflective surface 39b.

The front and rear resonant cavities 35a, 35b, 36a and 36b can be fabricated out of solid material with the reflective coatings applied thereto or they can be fabricated with air gaps defined by coated substrates separated by spacers, as is well known in the art. In the air gap version, the coated substrates are preferably wedge-shaped to prevent back reflections (see FIG. 3).

The reflectivity of the back surfaces 39a and 39b are as close to 100% as possible, and preferably within the range of 95% to 100%. The middle surfaces 38a and 38b preferably have a reflectivity ranging between 6% and 30%, while the front surfaces 37a and 37b have a relatively low reflectivity, preferably ranging from between 0% and 5%. The front resonant cavities are designed to reduce overall dispersion without perturbing the spectrum.

In particular, the front resonant cavities 35a and 35b are designed to modify the dispersion profiles produced by the rear resonant cavities 36a and 36b, respectively, so that the overall dispersion profile of the first multi-cavity etalon 34 is complimentary to the dispersion profile of the second multi-cavity etalon 44. Ideally, the front resonant cavities 35a and 35b adjust the dispersion profiles from the rear resonant cavities 36a and 36b, respectively, providing the overall dispersion profiles with symmetrical peaks (see the discussion of FIGS. 3b to 3d below). In other words, because of the quasi-periodic nature of the chromatic dispersion resulting from the first and second multi-cavity etalons 34 and 44, it is the object of the design process for the dispersion profile of the first multi-cavity etalon 34 to have similar periodicity and amplitude as the dispersion profile of the second multi-cavity etalon 44, only shifted so that the positive slopes of one profile are aligned with the negative slopes of the other profile. Obviously, it is impossible to eliminate all dispersion, but a great deal of the dispersion can be compensated for by this arrangement, as evidenced by FIGS. 4b and 4c.

Figure 3A:
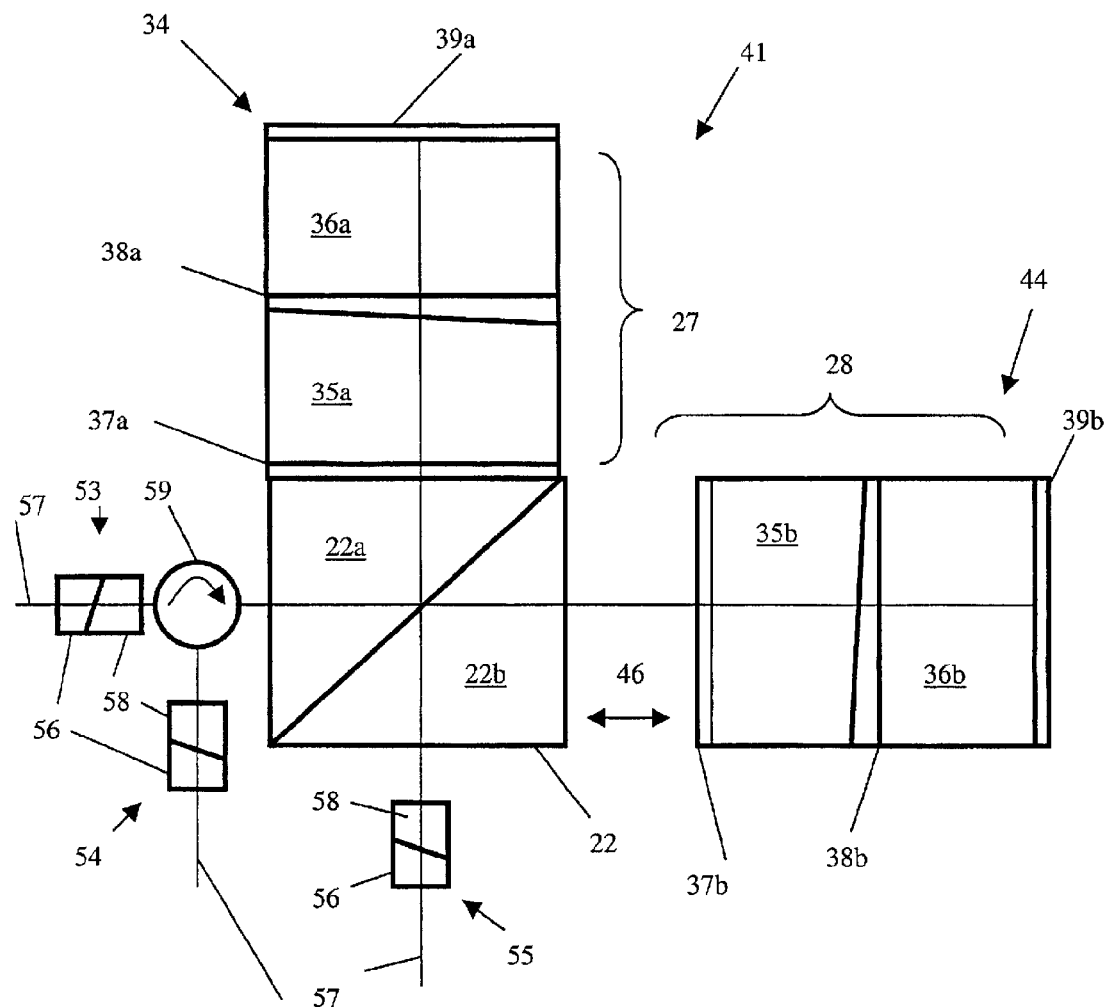
FIG. 3a is a schematic representation of a multi-cavity MGT interferometer with an optical path length difference between the two arms thereof according to another embodiment of the present invention.

FIG. 3a illustrates an interferometer 41, similar to interferometer 21, illustrated in FIG. 2, with an effective optical path length difference introduced between the first and second arms 27 and 28. The optical path length difference can be introduced by providing an air gap 46 or by positioning a transparent spacer (not shown) between the multi-cavity etalon 44 and the beam splitter 22. FIG. 3a also illustrates an alternative means for launching and outputting the signals into and from the interferometer 41. In this embodiment only an input port 53 and two output ports 54 and 55 are required. As before, each port includes a ferrule 56 encompassing an end of an optical waveguide 57, which is optically coupled to a GRIN lens 58. The input beam of light is launched so that the beam splitter 22 will split the beam, and direct the sub-beams at angles normal to the first and second multi-cavity resonators 34 and 44. After re-combining and interfering, one of the output beams will travel out via one of the output ports 55, while the other output beam will travel towards the input port 53, only to be re-routed by a circulator 59 to the other output port 54. Obviously, the circulator 59 can be replaced by another equally effective device known in the art.

If we assume that each of the resonant cavities 35a, 35b, 36a and 36b have an optical cavity length of 2L (as defined above), effective dispersion compensation has been obtained when the optical path length difference is one half of the optical cavity length, i.e. L. Particularly effective dispersion compensation has been obtained when the optical path length difference is L+Δ, where Δ equals +/−($\lambda_c$/4) or a multiple thereof, and the cavity lengths of the resonant cavities in the shorter arm have been de-phased by Δ., i.e. the optical cavity length of the resonant cavities 35a and 36a is 2L+Δ.

Figures 3B, 3C, 3D:
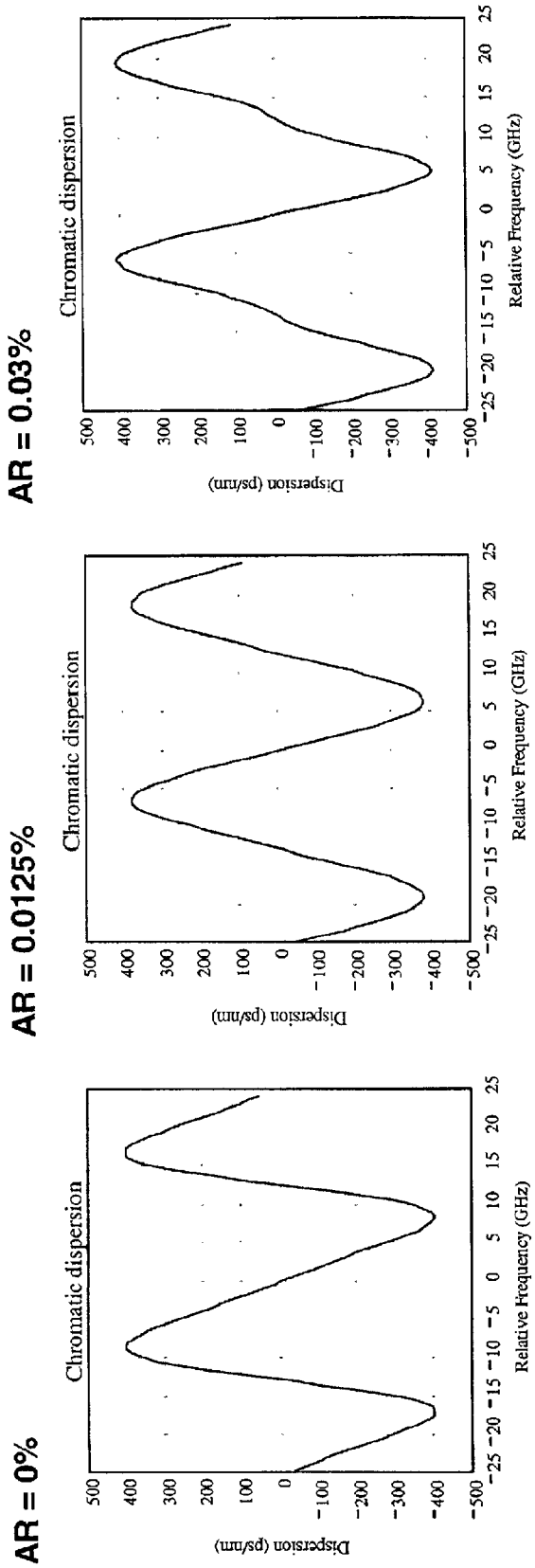
FIGS. 3b to 3d are examples of dispersion profiles resulting from the multi-cavity etalon of FIG. 3a, in which the front cavities have different front reflectivities.

FIGS. 3b to 3d illustrate the effect of changing the reflectivity of the front surfaces 37a and 37b in a 25 GHz interleaver with a middle surface 38a and 38b reflectivity of 2.2%. In FIG. 3b the front cavity is effectively eliminated by reducing the reflectivity to 0%, and the resulting dispersion profile has asymmetrical ("shark-fin") peaks. If the front surfaces 37a and 37b are provided with a reflectivity of approximately 0.0125% (FIG. 3c) the peaks become substantially symmetrical. If the reflectivity is increased, as in FIG. 3d, the dispersion profile becomes non-linear. Other relatively good results can be obtained by readjusting the reflectivity of the middle surfaces 38a and 38b, and determining the best possible front surface reflectivity.

Figure 4A:
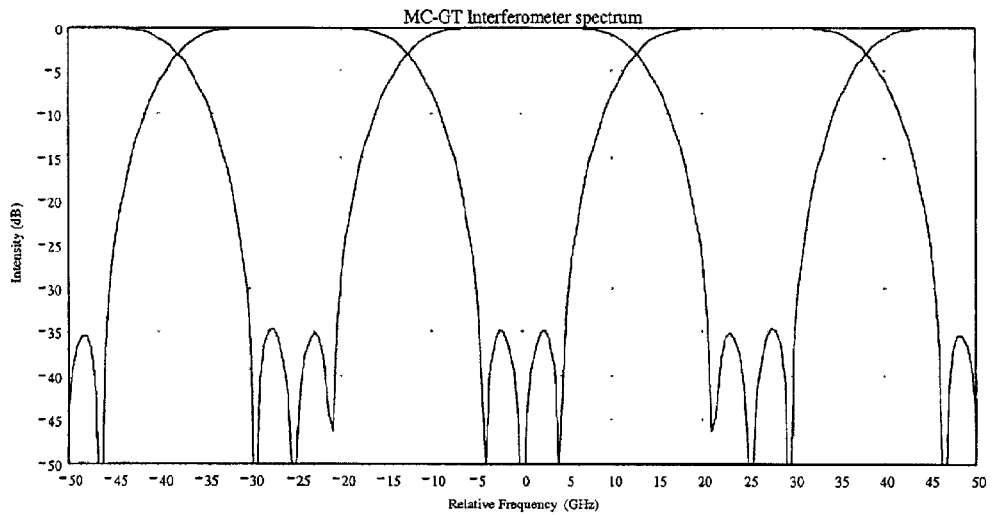
FIG. 4a is a spectral response for a multi-cavity MGT interleaver with de-phased arms and a specific optical path length difference.
Figure 4B:
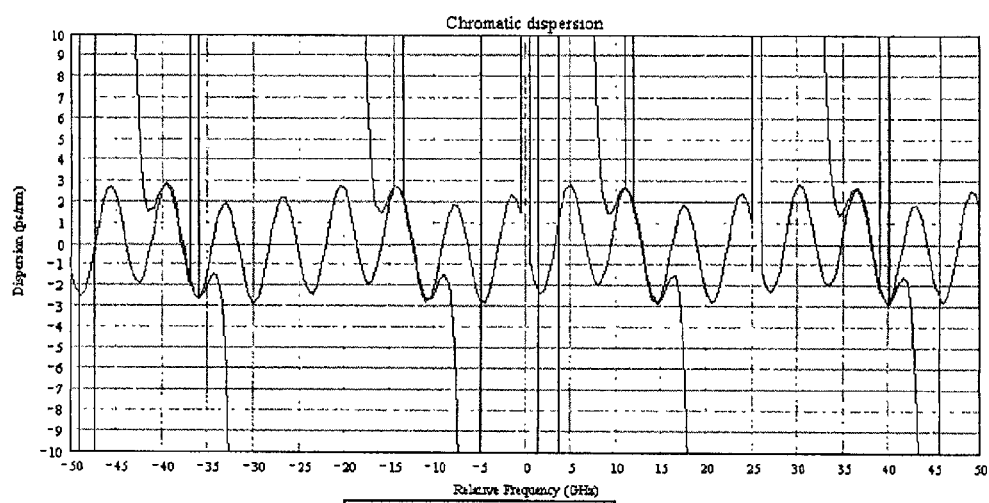
Figure 4C:
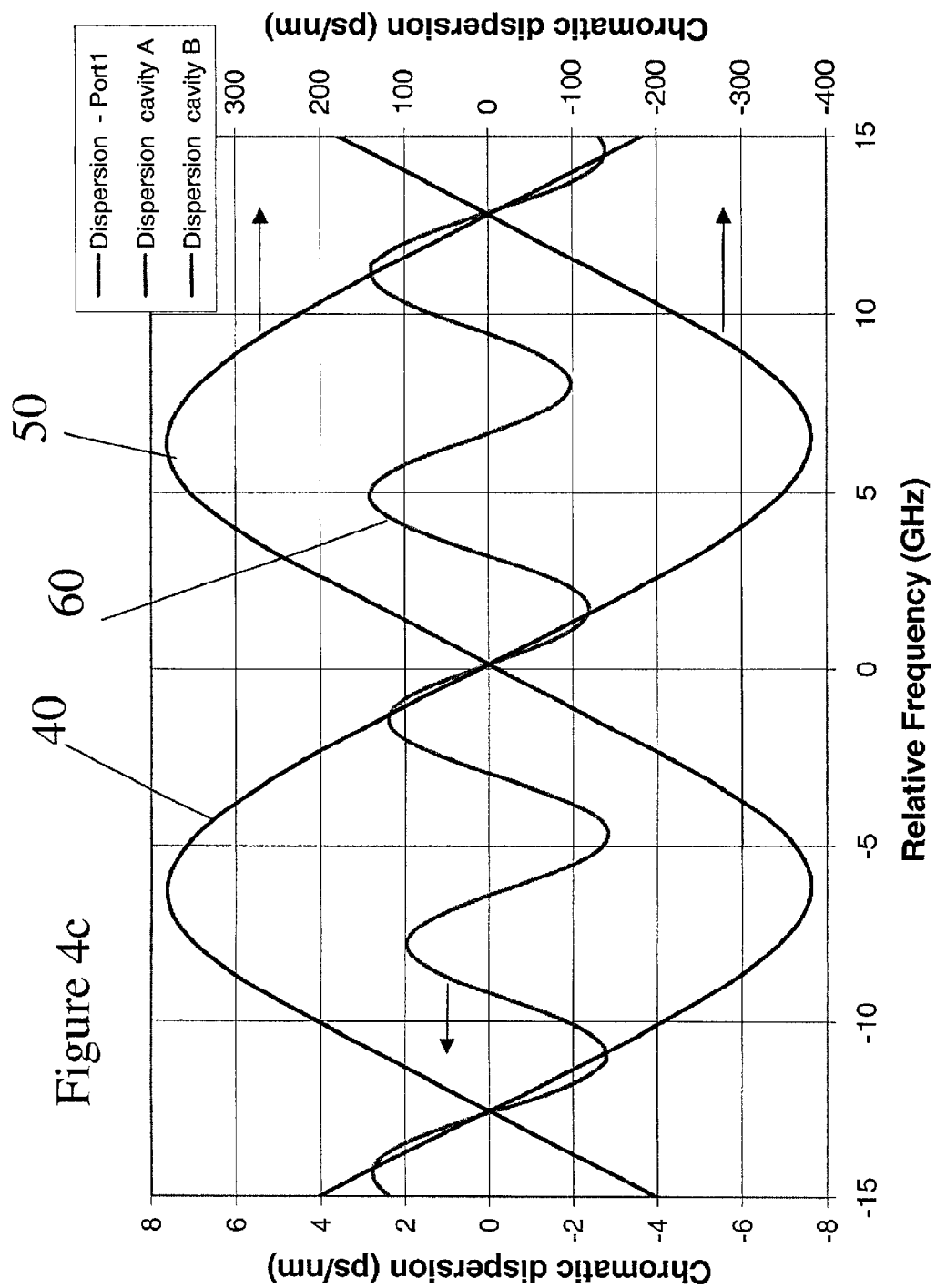
FIG. 4c illustrates the complementary dispersion profiles of first and second multi-cavity etalons of the interleaver of FIG. 4a, as well as the resultant dispersion profile.

FIGS. 4a and 4b illustrate associated spectral response and dispersion profiles, respectively, for such a multi-cavity MGT interferometer with de-phased cavity lengths and an optical path length difference of L+Δ. For this example, the reflectivity of the front surfaces 37a and 37b is approximately 0.013% (or −39 dB), the reflectivity of the middle surfaces 38a and 38b is approximately 2.2%, and the reflectivity of the back surfaces 39a and 39b is approximately 99.5%. Due to the low reflectivity of the front surfaces 37a and 37b, the middle surfaces 38a and 38b are wedged shaped to minimize back reflection. FIG. 4c illustrates complementary dispersion profiles 40 and 50 from the first and second multi-cavity etalons 34 and 44, respectively, while line 60 represents the overall dispersion of an output signal. The plot in FIG. 4c clearly illustrates how the positive slopes of dispersion profile 40 are aligned with the negative slopes of dispersion profile 50 for reducing the overall dispersion profile 60. The resultant chromatic dispersion, represented by line 60 is not the exact summation of the chromatic dispersions from the first and second multi-cavity etalons 34 and 43 (lines 40 and 50, respectively). In fact, there is an interference effect between the electrical fields from the two multi-cavity etalons 34 and 44 that determines the overall dispersion.

Figure 5:
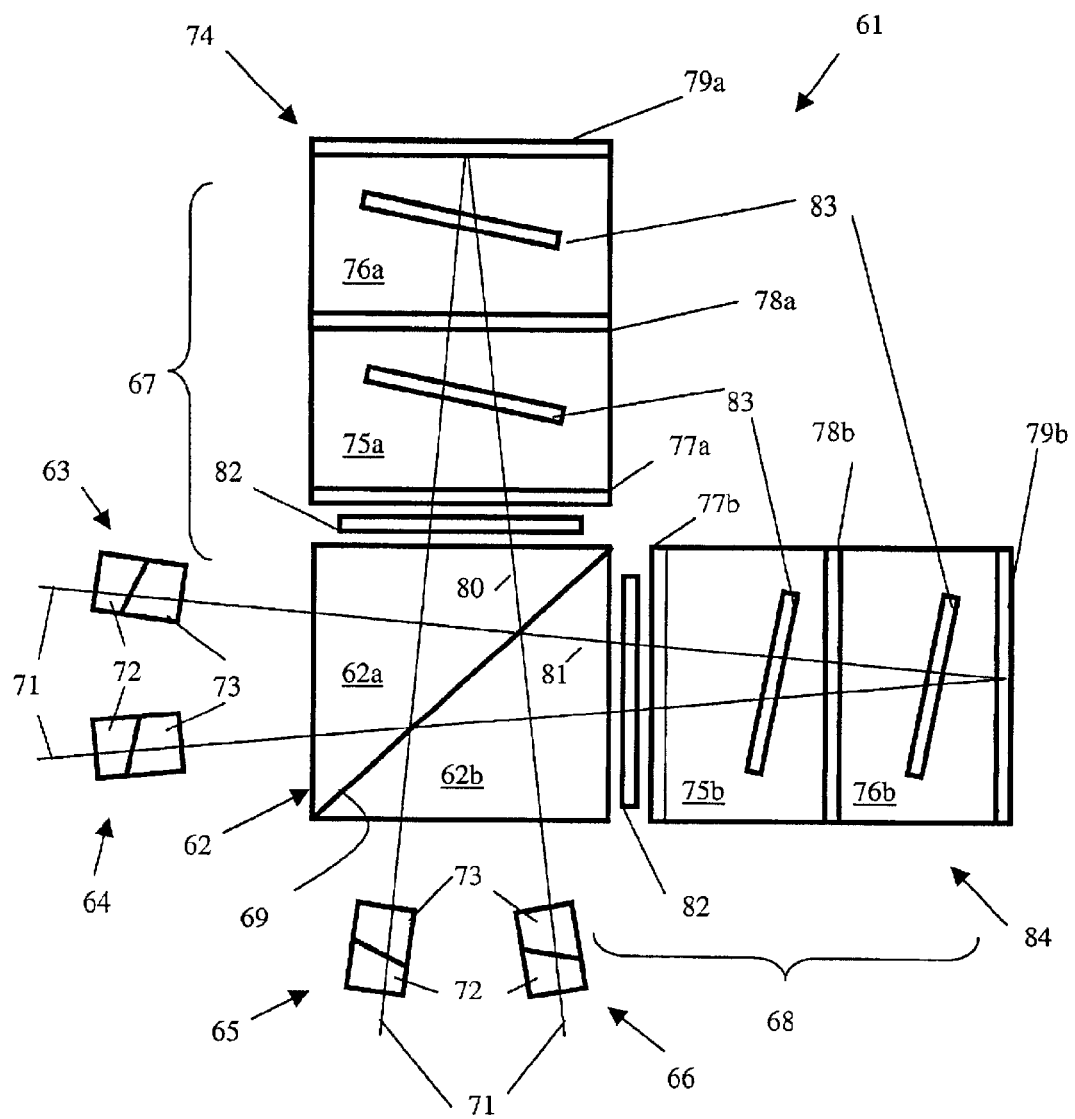
FIG. 5 is a schematic representation of a polarization-based multi-cavity BGT interferometer according to another embodiment of the present invention.

A polarization-based version of the present invention is illustrated in FIG. 5, in which an interferometer 61 includes a polarization beam splitter (PBS) 62, a first port 63, a second port 64, a third port 65, a fourth port 66, a first arm 67, and a second arm 68. The PBS 62 comprises two triangular prisms 62a and 62b with a polarization beam splitting coating 69 therebetween. Each of the ports 63, 64, 65 and 66 includes an optical waveguide 71, encased in a ferrule tube 72, and optically coupled to a GRIN lens 73. The first arm 67 includes a multi-cavity BGT etalon 74 comprising a first resonant cavity 75a and a second resonant cavity 76a. The first resonant cavity 75a is defined by a front partially-reflective surface 77a and a middle partially-reflective surface 78a. The second resonant cavity 76a is defined by the middle partially-reflective surface 78a and a back substantially fully reflective surface 79a. Similarly, the second arm 68 includes a multi-cavity BGT etalon 84 comprising a first resonant cavity 75b and a second resonant cavity 76b. The first resonant cavity 75b is defined by a front partially-reflective surface 77b and a middle partially-reflective surface 78b. The second resonant cavity is defined by the middle partially-reflective surface 78b and a back substantially fully reflective surface 79b. The reflectivity of the front surfaces 77a and 77b is preferably between 0.3% and 1.2%, and ideally 0.7%. The reflectivity of the middle surfaces 78a and 78b is preferably between 6% and 22%, and ideally 14%. The back surfaces 79a and 79b are preferably as close to 100% as possible, but typically ranges between 95% and 100%. Each arm 67 and 68 includes a first phase shifting element 82, preferably in the form of an ⅛ waveplate aligned at a 45° angle. Each resonant cavity 75a, 75b, 76a and 76b includes a second phase shifting element 83, preferably in the form of a ¼ waveplate at a 45° angle.

The PBS 62 splits an input beam of light from the first port 63 into orthogonally polarized sub-beams 80 and 81. The sub-beams 80 and 81 each pass through one of the first phase shifting element 82, whereby an initial phase shift is introduced between the respective components thereof. As the light passes through each of the second phase shifting elements 83, an additional phase shift is introduced between the components of the sub-beams 80 and 81, whereby the polarization of every other wavelength channel is rotated by 90°. Accordingly, when the sub-beams 80 and 81 are recombined in the beam splitter 62, the odd (or even) spaced wavelength channels with one polarization are directed to the second port 64, while the even (or odd) spaced wavelength channels with the orthogonal polarization are directed to the third port 65.

Figure 6:
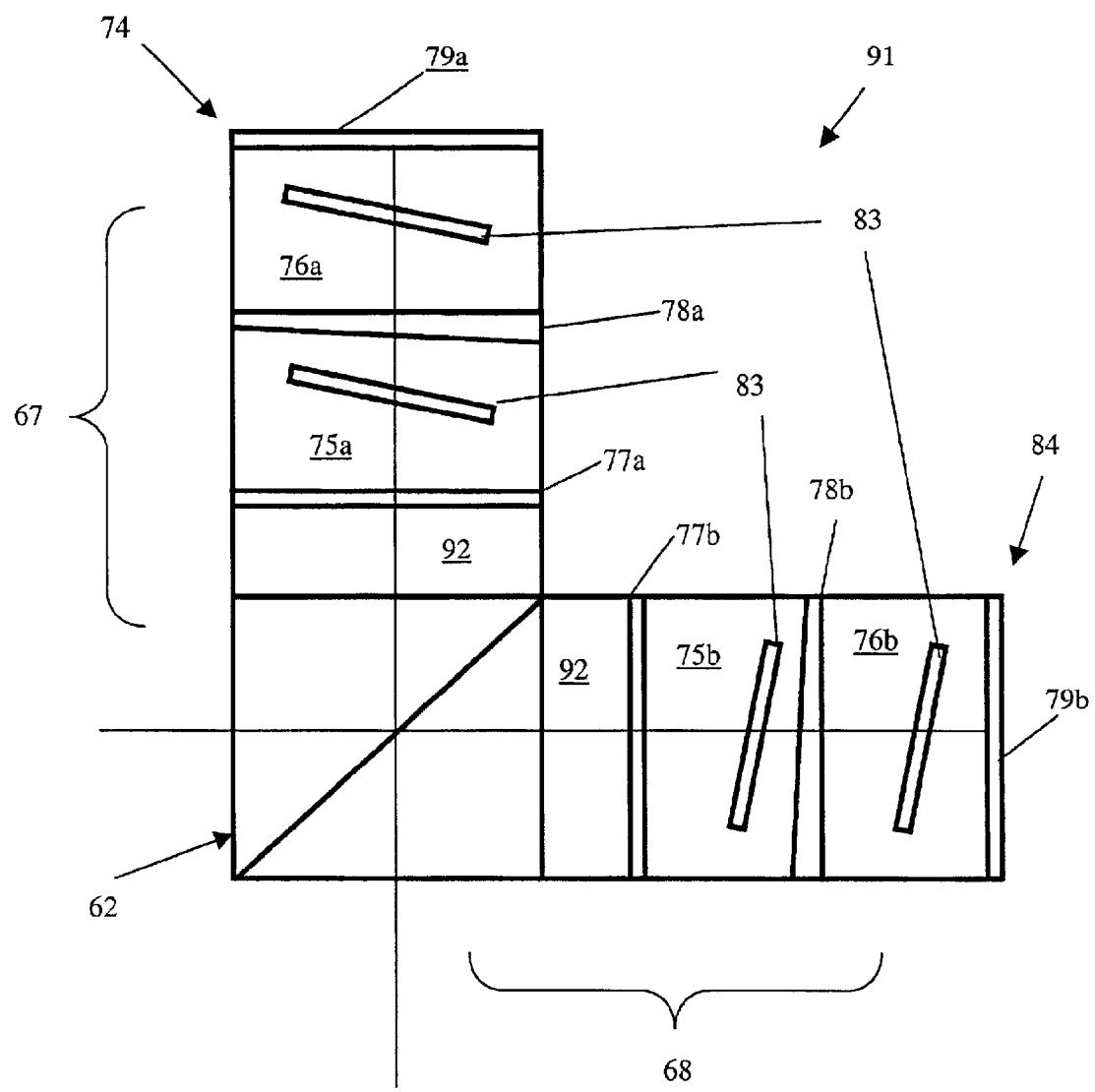
FIG. 6 is a schematic representation of a polarization-based multi-cavity BGT interferometer with an optical path length difference between the two arms thereof according to another embodiment of the present invention.

FIG. 6 illustrates another embodiment of the present invention, in which a polarization-based interferometer 91 introduces an optical path length difference between the components of the sub-beams. The interferometer 91 is very similar to the interferometer 61 of FIG. 5; however the first phase biasing elements 82 are replaced by wider birefringent delay sections 92. The delay section 92 introduce a larger optical path length difference between the components of the sub-beams 80 and 81, such as the previously discussed distance L or L+Δ.

Figure 8:
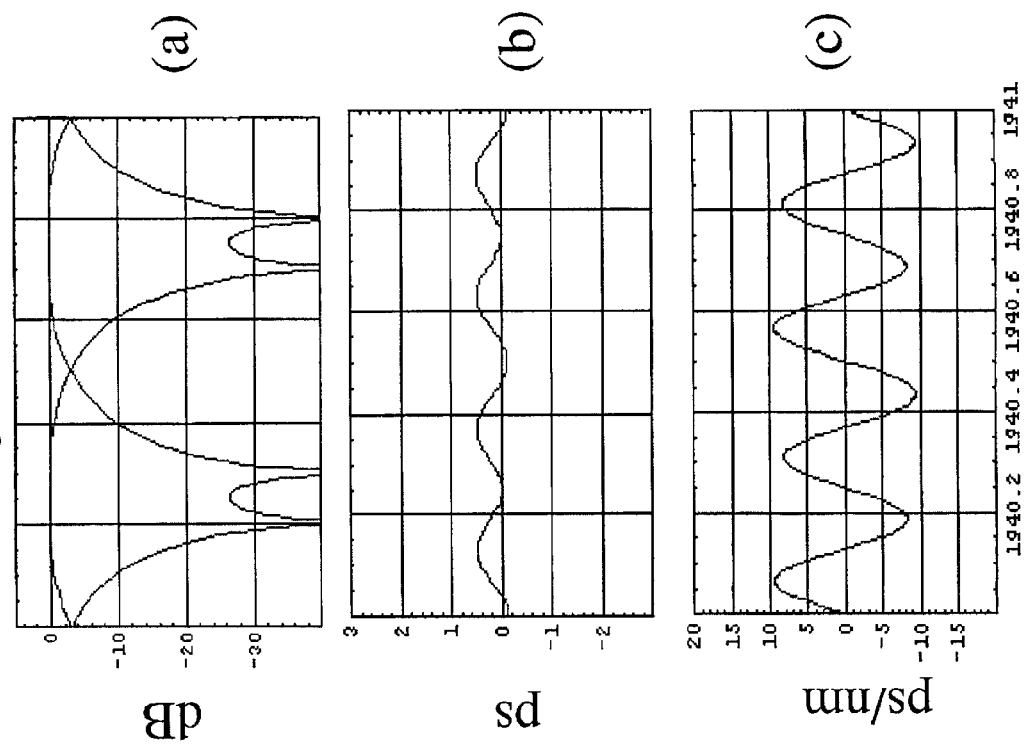
FIGS. 8a to 8c are response and dispersion curves for a polarization-based 50 GHz multi-cavity BGT interleaver according to the present invention.
Figure 7:
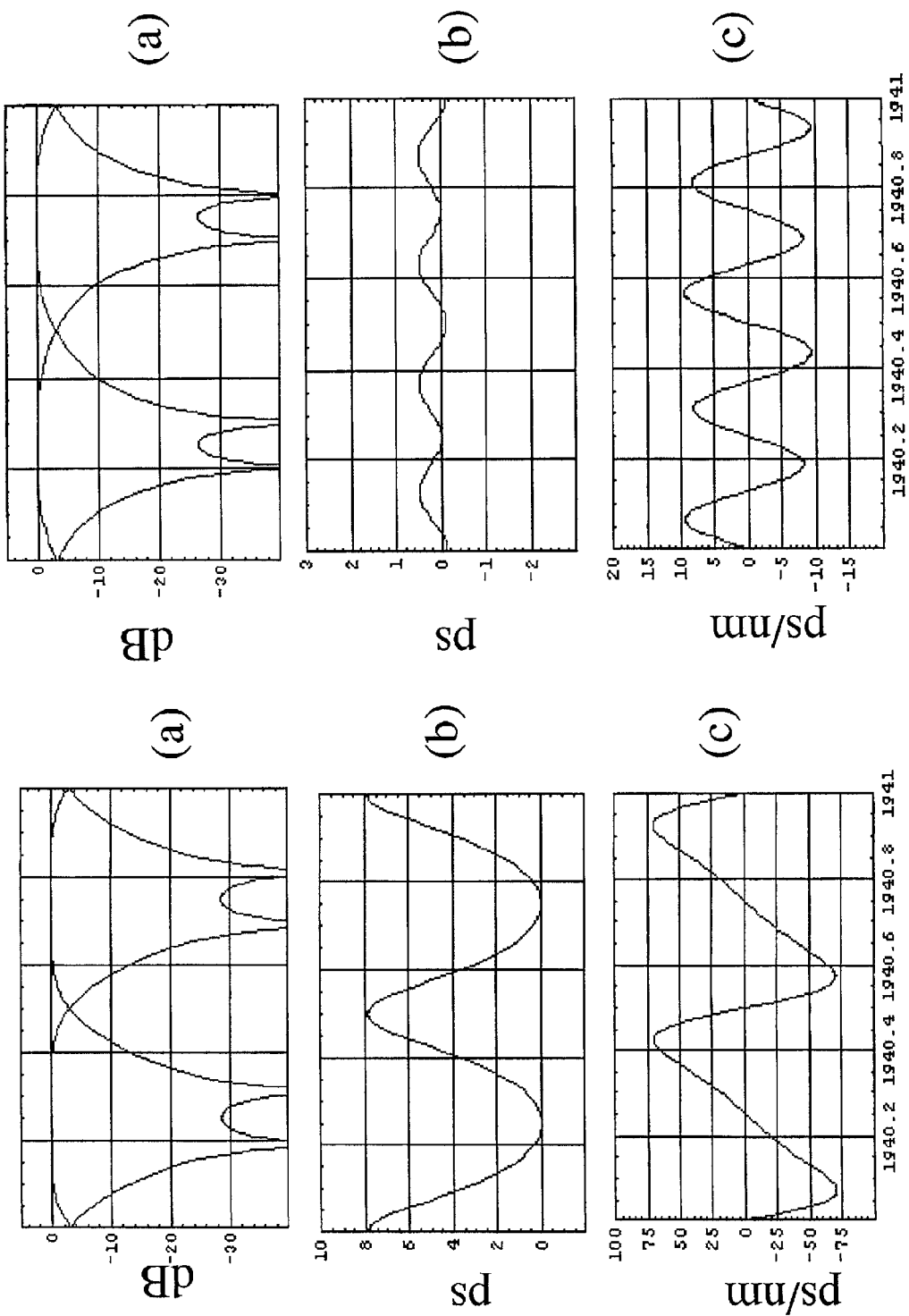
FIGS. 7a to 7c are response and dispersion curves for a conventional polarization-based 50 GHz BGT interleaver.

FIGS. 7a to 7c illustrate spectral and dispersion profiles for a conventional single cavity 50 GHz BGT interleaver, while FIGS. 8a to 8c illustrate similar plots for a multi-cavity BGT according to FIG. 5. In this example, the reflectivity of the front surfaces 77a and 77b is 0.7%, the reflectivity of the middle surfaces 78a and 78b is 14%, and the reflectivity of the back surfaces 79a and 79b is 99.5%. The chromatic dispersion is reduced from 75 ps/nm to less than 10 ps/nm with very little reduction in passband width.

A single BGT version of the present invention is illustrated in FIG. 9, in which an interferometer 101 includes an input port 102, a first output port 103, a second output port 104, a first polarization beam splitter (PBS) 105, a second PBS 106, a non-reciprocal polarization rotator 107, and a single multi-cavity BGT resonator 174.

Each port includes an optical waveguide 111 encased in a ferrule tube 112 and optically coupled to a lens 113. A birefringent beam splitter 114 is optically coupled to the lens 113 for separating input light into orthogonally polarized sub-beams and/or for combining like-polarized sub-beams of output light into a single beam. A ½-waveplate 116 is provided for rotating the polarization of one of the sub-beams parallel with the other. As seen from the side in FIGS. 10a and 10b, the waveplate 116 is positioned at a different location at the input port 102 than at the output ports 103 and 104, for reasons that will be explained below.

The first and second PBS 105 and 106 each include two triangular prisms 117 with a polarization beam splitting coating 118 therebetween. The non-reciprocal rotator 107 is comprised of a ¼ waveplate 121 and a Faraday rotator 122 arranged so that they have no resultant effect on the polarization of light traveling from the input port 102, while rotating the polarization of light traveling from the second PBS 106 towards the input port 102 by 90°.

The multi-cavity BGT resonator 174 includes a front resonant cavity 175 and a rear resonant cavity 176. A front partially reflective surface 177 and a middle partially reflective surface 178 define the front resonant cavity 175, while the middle surface 178 and a back substantially fully reflective surface 179 define the rear resonant cavity 176. Preferably, the substrate with the middle partially reflective surface 178 is wedge-shaped to prevent back reflections. The reflectivity of the front, middle and back surfaces 177, 178 and 179, respectively, are similar to those of the corresponding surfaces from interferometers 61 and 91. A first phase biasing element 182, preferably in the form of a ⅛-waveplate, is positioned between the second PBS 106 and the multi-cavity etalon 174. If a larger optical path length difference is desired, as in FIG. 6, the first phase biasing element 182 can be replaced by a wider birefringent delay section. A second phase biasing means 183, preferably in the form of a ¼-waveplate, is positioned in each resonant cavity 175 and 176.

With reference to FIGS. 9 and 10a, a randomly polarized beam of light is launched through input port 102, wherein the light is collimated by lens 113, and separated into orthogonally polarized sub-beams by birefringent beam splitter 114. The polarization of one of the sub-beams, e.g. the extraordinary sub-beam, is rotated by 90° by the waveplate 116, so that both sub-beams have the same polarization, e.g. vertical. For the sake of convenience, since both sub-beams are identical, we will only discuss the behavior of one until they are output. The input sub-beam travels through the first PBS 105, the non-reciprocal rotator 107, and the second PBS 106 essentially unchanged. The first phase biasing element aligned at 45° to the input sub-beam introduces an initial phase difference between the sub-beam's two components. As the light travels through the multi-cavity etalon 174, the second phase biasing elements 183 provide additional phase biasing, whereby the polarization of every other wavelength channel, e.g. the even channels, is rotated by 90° so that the wavelength channels in the sub-beam of light output from the multi-cavity etalon 174 have alternating polarizations. As a result, the wavelength channels, e.g. even channels, that have had their polarization rotated, e.g. to horizontal, will not travel through the second PBS 106, but will be re-directed to the second output port 104. The remaining wavelength channels, e.g. odd channels, travel through the second PBS 106, but will subsequently have their polarization rotated, e.g. to horizontal, by the non-reciprocal rotator 107, whereby the first PBS 105 will re-direct them to the first output port 103. As seen in FIG. 10b, because the polarization of both of the sub-beams is now orthogonal to their initial polarization (FIG. 10a) the waveplate 116 is positioned in a different path, e.g. the ordinary path, to ensure both sub-beams are recombined.

Figure 11:
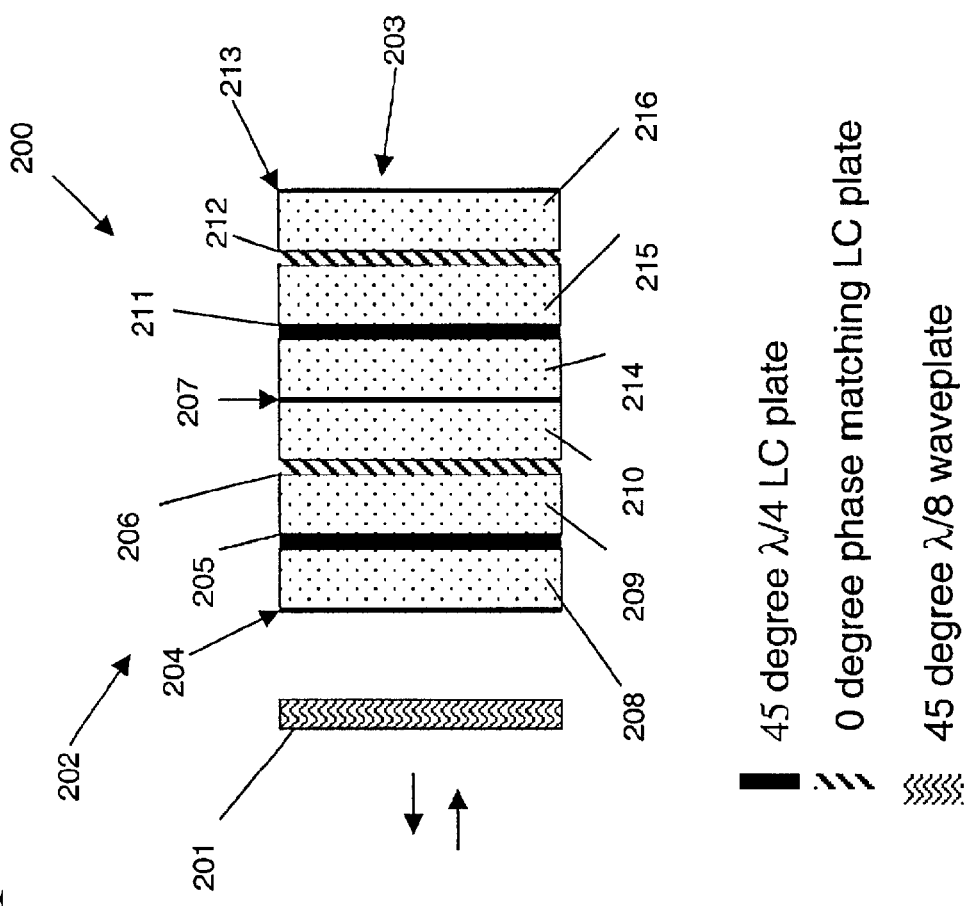
FIG. 11 is a schematic representation of a solid multi-cavity resonator for use with the embodiments of FIGS. 5 to 9.

Typically the multi-cavity BGT etalons include an air gap for each of the resonant cavities, whereby the second phase biasing elements 83 can be angle tuned; however, as illustrated in FIG. 11, it is possible to provide a solid version of a multi-cavity BGT etalon. The solid multi-cavity BGT etalon 200 includes a first phase biasing element 201, a front resonant cavity 202, and a rear resonant cavity 203. The first phase biasing element is preferably a conventional ⅛-waveplate oriented at a 45° angle to the incoming beam. Each resonant cavity has multi-layered sandwich arrangement. The front resonant cavity 202 includes a front partially reflective coating 204, a ¼ wave liquid crystal plate 205, a phase matching liquid crystal plate 206, and a middle reflective coating 207. These layers are spaced apart by first, second and third transparent blocks 208, 209 and 210. Similarly, the rear resonant cavity 203 includes the middle reflective coating 207, a ¼ wave liquid crystal plate 211, a phase matching liquid crystal plate 212, and a back reflective coating 213. Each of these layers is spaced apart by fourth, fifth, and sixth transparent blocks 214, 215, and 216.

Figure 12A:
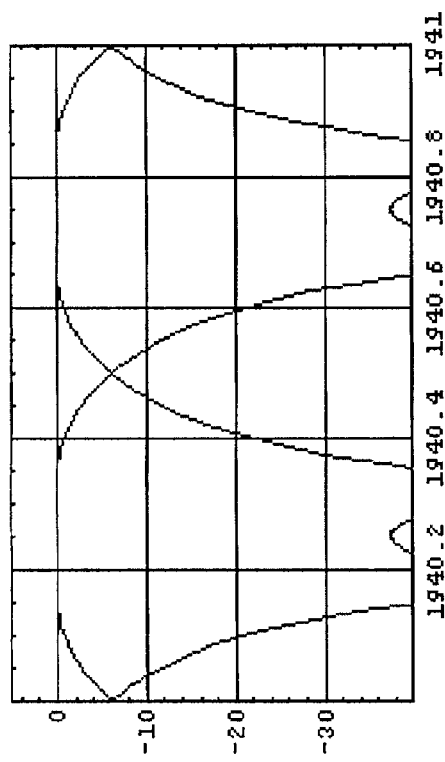
FIGS. 12a and 12b are response and dispersion profiles for a double passed 50 GHz BGT interleaver.
Figure 12B:
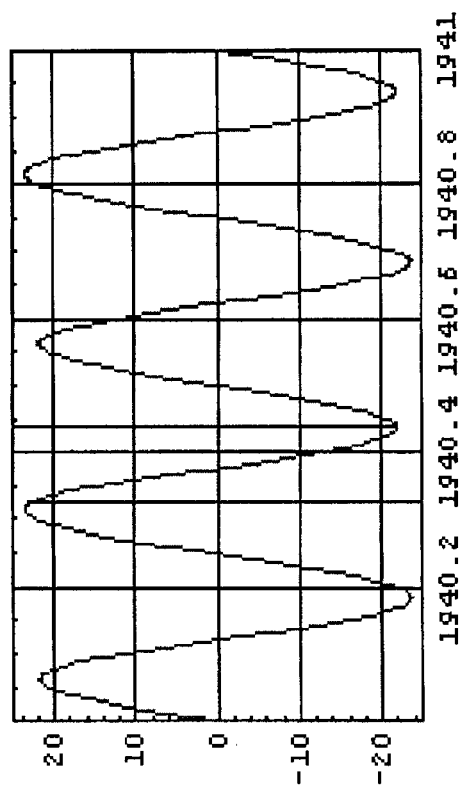

One method of altering the spectral response of a multi-cavity etalon interferometer is to double pass the sub-beams through their respective multi-cavity etalons. FIGS. 12a and 12b illustrate a spectral response and a dispersion profile, respectively, for a 50 GHz multi-cavity BGT in which the signals have been double passed through the multi-cavity etalons. In a comparison with FIGS. 8a and 8c, we can conclude that increased isolation can be obtained by paying a penalty of increased dispersion. This provides the designer with the flexibility to provide a device with varying specifications depending upon the system requirements.

We claim:

1. An interferometer comprising:
an first port for launching a first input optical signal;
a beam splitter for dividing the first input optical signal into first and second sub-beams, and for directing the first and second sub-beams along first and second optical paths, respectively;

a first multi-cavity resonator in the first optical path for re-directing the first sub-beam to interfere with the second sub-beam, the first multi-cavity resonator including a first resonant cavity providing a first dispersion profile to the first sub-beam, and a second resonant cavity for modifying the first dispersion profile resulting in a second dispersion profile for the first sub-beam;

a second multi-cavity resonator in the second optical path for re-directing the second sub-beam to interfere with the first sub-beam forming first and second output beams, the second multi-cavity resonator including a third resonant cavity providing a third dispersion profile to the second sub-beam, and a fourth resonant cavity for modifying the third dispersion profile resulting in a fourth dispersion profile for the second sub-beam, wherein dispersion from the first multi-cavity resonator compensates for dispersion in the second multi-cavity resonator providing less overall dispersion to the first and second output beams;

a second port for outputting the first output signal; and a third port for outputting the second output signal.

2. The interferometer according to claim 1, wherein the second resonant cavity ensures that the second dispersion profile has substantially symmetrical peaks; and wherein the fourth resonant cavity ensures that the fourth dispersion profile has substantially symmetrical peaks.

3. The interferometer according to claim 1, wherein the second and fourth resonant cavities ensure that the second dispersion profile is substantially complementary to the fourth dispersion profile.

4. The interferometer according to claim 1, wherein the second and fourth resonant cavities ensure that the second dispersion profile has similar amplitude and frequency as the fourth dispersion profile; and wherein the second dispersion profile is shifted relative to the fourth dispersion profile, whereby negative dispersion slopes of the second dispersion profile are substantially aligned with positive dispersion slopes of the fourth dispersion profile.

5. The interferometer according to claim 1, further comprising double passing means for double passing the first sub-beam through the first multi-cavity resonator, and for double passing the second sub-beam through the second multi-cavity resonator.

6. The interferometer according to claim 1, wherein the first and third resonant cavities are each defined by a front partially reflective coating ranging between 0% and 5%, and a middle partially reflective coating ranging between 6% and 30%; and wherein the second and fourth resonant cavities are each defined by the middle partially reflective coating, and a back reflective coating ranging between 95% and 100%.

7. The interferometer according to claim 1, further comprising:

first phase-biasing means in the first optical path for re-orienting the first sub-beam into orthogonally polarized components;

second phase-biasing means in the second optical path for re-orienting the second sub-beam into orthogonally polarized components; and third phase biasing means provided in each of the first and second resonant cavities for providing an optical path length difference between the orthogonally polarized components of the first sub-beam; and fourth phase biasing means provided in each of the third and fourth resonant cavities for providing an optical path length difference between the orthogonally polarized components of the second sub-beam;

wherein the beam splitter is a polarization beam splitter.

8. The interferometer according to claim 7, wherein the first and second phase biasing means are ⅛ waveplates; and wherein the third and fourth phase biasing means are ¼ waveplates.

9. The interferometer according to claim 7, wherein the first resonant cavity is defined by a front partially reflective coating ranging between 0.3% and 1.2%, and a middle partially reflective coating ranging between 6% and 22%; and wherein the second resonant cavity is defined by the middle partially reflective coating, and a back reflective coating ranging between 95% and 100%.

10. The interferometer according to claim 1, wherein the first, second, third and fourth resonant cavities each have an effective cavity length substantially equal to 2L;

wherein $2L=c/(2 \times FSR \times n \times \cos(\theta))$, in which: c is the speed of light; FSR is a free spectral range of the resonant cavities, which is selected from the group consisting of 25 GHz, 50 GHz, 100 GHz and 200 GHz; n is the index of refraction of the resonant cavities; and $\theta$ is an angle of incidence of the first and second sub-beams on the first and second multi-cavity resonators, respectively; and wherein the first and second output beams comprise odd and even spaced wavelength channels, respectively, from the input optical signal.

11. The interferometer according to claim 10, wherein the second and third ports also are for launching second and third input optical signals into the beamsplitter;

wherein the beamsplitter also is for splitting the second and third input optical signals into fifth, sixth, seventh and eighth sub-beams, and for directing the fifth and seventh sub-beams to the first multi-cavity resonators, and the sixth and eighth sub-beams to the second multi-cavity resonator;

wherein the first and second multi-cavity resonators also are for directing the fifth, sixth, seventh and eighth sub-beams to interfere together forming a third output optical signal;

wherein dispersion from the first multi-cavity etalon also cancels dispersion in the fifth, sixth, seventh and eighth sub-beams caused by the second multi-cavity etalon; and wherein the first port also is for outputting the third output optical signal.

12. The interferometer according to claim 10, wherein the first optical path has a different effective length than the second optical path, whereby a optical path length difference exists.

13. An interferometer comprising:

a first port for launching a first input optical signal;

first phase-biasing means for introducing an initial phase difference between first and second orthogonally polarized components of the first input optical signal;

a multi-cavity resonator comprising first and second resonant cavities, each of the first and second resonant cavities including second phase biasing means for providing an additional phase difference between the first and second components of the input optical signal, whereby, when the first and second components are recombined, first and second output beams are formed; wherein the first resonant cavity provides first and second dispersion profiles to the first and second components, respectively, and the second resonant cavity modifies the first and second dispersion profiles resulting in third and fourth dispersion profiles, respectively, whereby the dispersion from the first component compensates for the dispersion from the second component, and the first and second output signals have less overall dispersion;

a second port for outputting the first output signal; and a third port for outputting the second output signal.

14. The interferometer according to claim 13, further comprising a polarization beam splitter for directing the input optical signal into the multi-cavity resonator, and for directing the first and second output beams towards the first and second output ports, respectively.

15. The interferometer according to claim 13, wherein the second resonant cavity ensures the third dispersion profile is substantially complementary to the fourth dispersion profile.

16. The interferometer according to claim 13, wherein the third dispersion profile has similar amplitude and frequency as the fourth dispersion profile; and wherein the third dispersion profile is shifted relative to the fourth dispersion profile, whereby negative dispersion slopes of the third dispersion profile are substantially aligned with positive dispersion slopes of the fourth dispersion profile.

17. The interferometer according to claim 13, wherein the first resonant cavity is defined by a front partially reflective coating ranging between 0.3% and 1.2%, and a middle partially reflective coating ranging between 6% and 22%; and wherein the second resonant cavity is defined by the middle partially reflective coating, and a back reflective coating ranging between 95% and 100%.

18. The interferometer according to claim 13, wherein the first phase biasing means is substantially a ⅛ waveplate; and wherein the second phase biasing means is substantially a ¼ waveplate.

19. The interferometer according to claim 14, wherein the first and second resonant cavities each have an effective cavity length substantially equal to 2L;

wherein $2L=c/(2\times FSR \times n \times \cos(\theta))$, in which: c is the speed of light; FSR is a free spectral range of the resonant cavities, which is selected from the group consisting of 25 GHz, 50 GHz, 100 GHz and 200 GHz; n is the index of refraction of the resonant cavities; and $\theta$ is an angle of incidence of the first and second sub-beams on the first and second multi-cavity resonators, respectively; and wherein the first and second output beams comprise odd and even spaced wavelength channels, respectively, from the input optical signal, the odd and even spaced wavelength channels being orthogonally polarized.

20. The interferometer according to claim 19, wherein the second and third ports also are for launching second and third orthogonally-polarized input optical signals;

wherein the polarization beam splitter also is for directing the second and third input optical signals to the multi-cavity resonator;

wherein the first phase biasing means also is for re-orienting the second and third input optical signals into respective first and second orthogonally-polarized components;

wherein the multi-cavity resonator also is for directing the first and second components of the second and third input optical signals to interfere together forming a third output optical signal;

wherein the second resonant cavity also is for modifying dispersion in the first and second components of the second and third input optical signals caused by the first resonant cavity to reduce overall dispersion in the third output optical signal; and wherein the first port also is for outputting the third output optical signal.

* * * * *